(12) United States Patent
Hoess et al.

(10) Patent No.: US 11,220,254 B2
(45) Date of Patent: Jan. 11, 2022

(54) HYBRID DRIVE TRANSMISSION UNIT AND METHOD FOR OPERATING A VEHICLE WITH A HYBRID DRIVE

(71) Applicant: Bayerische Motoren Werke Aktiengesellschaft, Munich (DE)

(72) Inventors: Bernhard Hoess, Munich (DE); Thomas Jung, Munich (DE); Sebastian Kobler, Gruentegernbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 72 days.

(21) Appl. No.: 16/743,241

(22) Filed: Jan. 15, 2020

(65) Prior Publication Data

US 2020/0148194 A1 May 14, 2020

Related U.S. Application Data

(63) Continuation of application No. PCT/EP2018/069203, filed on Jul. 16, 2018.

(30) Foreign Application Priority Data

Aug. 18, 2017 (DE) .................... 10 2017 214 396.7

(51) Int. Cl.
*B60K 6/30* (2007.10)
*B60W 10/08* (2006.01)
(Continued)

(52) U.S. Cl.
CPC ............... *B60W 20/40* (2013.01); *B60K 6/30* (2013.01); *B60K 6/387* (2013.01); *B60K 6/40* (2013.01);
(Continued)

(58) Field of Classification Search
CPC ...... B60W 20/40; B60W 10/02; B60W 10/06; B60W 10/08; B60W 10/115; B60W 20/30;
(Continued)

(56) References Cited

U.S. PATENT DOCUMENTS

| 3,934,690 A | 1/1976 | Janning |
| 8,386,106 B2 | 2/2013 | Favaretto |

(Continued)

FOREIGN PATENT DOCUMENTS

| CN | 106476610 A | 3/2017 |
| DE | 199 34 936 A1 | 2/2000 |

(Continued)

OTHER PUBLICATIONS

International Search Report (PCT/ISA/210) issued in PCT Application No. PCT/EP2018/069203 dated Oct. 8, 2018 with English translation (seven (7) pages).

(Continued)

*Primary Examiner* — David J Hlavka
(74) *Attorney, Agent, or Firm* — Crowell & Moring LLP

(57) ABSTRACT

A hybrid drive transmission unit for a vehicle with an internal combustion engine and an electric motor for the drive part, includes a power-split transmission with sub-transmissions and a torsion-damping unit with a gyrating mass interconnected between the internal combustion engine and the power-split transmission. A clutch is interconnected between the internal combustion engine and the torsion-damping unit, by which the internal combustion engine can be activated, switching from the electromotive operating mode.

17 Claims, 11 Drawing Sheets

(51) Int. Cl.
  *B60W 20/40* (2016.01)
  *B60K 6/387* (2007.10)
  *B60K 6/40* (2007.10)
  *B60W 10/02* (2006.01)
  *B60W 10/06* (2006.01)
  *B60W 10/115* (2012.01)

(52) U.S. Cl.
  CPC ............ *B60W 10/02* (2013.01); *B60W 10/06* (2013.01); *B60W 10/08* (2013.01); *B60W 10/115* (2013.01); *B60Y 2200/92* (2013.01)

(58) Field of Classification Search
  CPC ......... B60W 20/10; B60W 2510/0208; B60W 2510/0216; B60W 2510/0225; B60W 2510/0241; B60W 2510/0275; B60W 2510/0283; B60W 2510/0638; B60W 2510/0657; B60W 2510/08; B60W 2510/081; B60W 2510/083; B60W 2510/1005; B60W 10/00; B60W 10/113; B60W 10/24; B60W 20/00; B60W 30/192; B60K 6/30; B60K 6/387; B60K 6/40; B60K 2006/4825; B60K 6/48; B60K 6/547; B60K 6/20; B60K 6/36; B60K 6/26
  See application file for complete search history.

(56) References Cited

U.S. PATENT DOCUMENTS

| | | | | |
|---|---|---|---|---|
| 8,776,921 B2* | 7/2014 | Richter | ........... | B60W 30/18027 180/65.285 |
| 8,808,137 B2* | 8/2014 | Kaltenbach | ........... | B60W 30/19 477/5 |
| 2002/0033059 A1* | 3/2002 | Pels | ........ | F16H 63/22 74/329 |
| 2005/0064987 A1* | 3/2005 | Budal | ................... | B60W 10/10 477/3 |
| 2011/0087412 A1 | 4/2011 | Marcigliano et al. | | |
| 2011/0259698 A1 | 10/2011 | Arnold et al. | | |
| 2013/0072337 A1* | 3/2013 | Lee | ........................ | B60K 6/40 475/5 |
| 2013/0282213 A1 | 10/2013 | Park | | |
| 2014/0200111 A1* | 7/2014 | Murakami | ............. | B60K 6/547 477/4 |
| 2014/0349799 A1 | 11/2014 | Kaltenbach et al. | | |
| 2015/0176682 A1 | 6/2015 | Ruehle et al. | | |
| 2019/0084575 A1 | 3/2019 | Luo et al. | | |

FOREIGN PATENT DOCUMENTS

| | | |
|---|---|---|
| DE | 101 60 884 A1 | 6/2003 |
| DE | 10 2010 004 711 A1 | 7/2011 |
| DE | 10 2010 061 827 A1 | 5/2012 |
| DE | 10 2013 201 881 A1 | 10/2013 |
| DE | 10 2013 022 142 A1 | 6/2015 |
| JP | 2001514595 A | 9/2001 |
| WO | WO 98/40647 A1 | 9/1998 |
| WO | WO 2013/083337 A1 | 6/2013 |
| WO | WO 2017/060010 A1 | 4/2017 |

OTHER PUBLICATIONS

German-language Written Opinion (PCT/ISA/237) issued in PCT Application No. PCT/EP2018/069203 dated Oct. 8, 2018 (six (6) pages).
German-language Search Report issued in counterpart German Application No. 10 2017 214 396.7 dated Apr. 19, 2018 with partial English translation (11 pages).
Hindi-language Office Action issued in Indian Application No. 202047010361 dated Oct. 4, 2021 with English translation (five (5) pages).
Japanese-language Office Action issued in Japanese Application No. 2020-509032 dated Nov. 4, 2021 with English translation (ten (10) pages).

* cited by examiner

HYBRID DRIVE TRANSMISSION UNIT AND METHOD FOR OPERATING A VEHICLE WITH A HYBRID DRIVE

CROSS REFERENCE TO RELATED APPLICATIONS

This application is a continuation of PCT International Application No. PCT/EP2018/069203, filed Jul. 16, 2018, which claims priority under 35 U.S.C. § 119 from German Patent Application No. 10 2017 214 396.7, filed Aug. 18, 2017, the entire disclosures of which are herein expressly incorporated by reference.

BACKGROUND AND SUMMARY OF THE INVENTION

The invention relates to a hybrid drive transmission unit for a vehicle which, for drive purposes, has an internal combustion engine and an electric motor, and also to a method for operating a vehicle with a hybrid drive.

Hybrid drives for vehicles, including motor vehicles, heavy goods vehicles, rail-bound vehicles, ships and the like, are becoming increasingly important in order to reduce the emission of pollutants and the emission of $CO_2$. There are systems in which the internal combustion engine and the electric motor drive different axles, and there are systems in which they drive the same axles or, generally speaking, output shafts. The invention relates to a hybrid drive transmission unit and also to a method for operating a vehicle with a hybrid drive, in which the internal combustion engine and the electric motor can drive the same output shaft. In this respect, there are driving states in which only the electric motor, only the internal combustion engine or both said electric motor and said internal combustion engine drive the output shaft.

The internal combustion engine usually has its own starter generator, that is to say an electric motor which requires a very large amount of energy for the purpose of starting the internal combustion engine. This energy has to be permanently provided when the vehicle is driving in the electric operating mode. This considerably reduces the power available for electric driving since the electrical power for the purpose of starting the internal combustion engine has to be permanently provided in the on-board electrical system and in the energy store.

Furthermore, consideration has been given to using the electric motor for driving the vehicle for the purpose of starting the internal combustion engine as well, but these systems require further improvement. In particular, starting the internal combustion engine results in an abrupt drop in power at the output shaft and undesired "jerking" of the vehicle.

The object of the invention is to provide an improved hybrid drive transmission unit for a vehicle, in which the above disadvantages are avoided, and also to specify a method for operating a vehicle with a hybrid drive which likewise avoids the above disadvantages.

The object of the invention is achieved firstly by a hybrid drive transmission unit for a vehicle which, for drive purposes, has an internal combustion engine and an electric motor, comprising a power-split transmission which is interconnected between the internal combustion engine and an output shaft and has component transmissions and associated component transmission clutches, wherein the electric motor is coupled to a component transmission which is close to the electric motor in order to be able to drive the output shaft by means of said component transmission. A torsion damping unit with an oscillating mass is interconnected between the internal combustion engine and the power-split transmission. Furthermore, a clutch is interconnected between the internal combustion engine and the torsion damping unit. The terms "which is close to the electric motor" and "which is remote from the electric motor" below do not relate to the spatial proximity but rather to the torque coupling which takes place directly into the component transmission which is close to the electric motor.

The power-split transmission can be, for example, a planetary transmission or a dual-clutch transmission.

The additional clutch is preferably seated firstly on the crankshaft and secondly on the torsion damping unit, wherein the torsion damping unit is then additionally directly coupled to the input of the dual-clutch transmission (here, the term "input" is related to the force flow during driving by the internal combustion engine).

Owing to the torsion damping unit with the oscillating mass which is either separate or is integrated into the torsion damping unit, the electric motor drives the oscillating mass in the electric motor driving mode, kinetic energy then being stored in said oscillating mass. This kinetic energy and possibly yet further kinetic energy is then suddenly introduced into the internal combustion engine by closing the additional clutch in order to bring said internal combustion engine to a sufficiently high rotation speed, at which it is self-sustaining. Therefore, a higher electrical power is available for the starting process. Furthermore, it is possible to disable or to considerably reduce an abrupt drop in the torque at the output shaft during the starting process by appropriately intelligent shifting of the component transmission clutches. The interconnected clutch allows an abrupt pulse start of the internal combustion engine.

The torsion damping unit is formed, for example, by a dual-mass flywheel, a torsion damper or a so-called rotation speed-adaptive absorber. In this case, as already explained, the oscillating mass can be part of the torsion damping unit, can be situated outside said torsion damping unit or an additional oscillating mass to an oscillating mass which is already integrated in the torsion damping unit can be provided.

The electric motor can be coupled to one of the two component transmissions, but in particular to that component transmission which contains 2nd gear, i.e. the 2nd lowest gear. This component transmission is usually that of the so-called "even" gears, i.e. gears 2, 4, 6 etc. and possibly the reverse gear.

The electric motor should even be coupled fixedly in terms of torque to its associated component transmission, e.g. on the drive side of the component transmission, between gear (i.e. the gear sets) and the associated component transmission clutch.

The interconnected clutch between the internal combustion engine and the torsion damping unit can be a rapidly shifting clutch which can be closed in fewer than 150 msec, in particular 50 msec. It is also referred to as a so-called digital clutch. Owing to this abrupt coupling of the crankshaft to the oscillating mass, hardly any heat is produced, and therefore the energy can be transmitted to the crankshaft with fewer losses. The oscillating mass carries along the internal combustion engine as it were.

A sufficiently high rotation speed at the oscillating mass is critical for starting the internal combustion engine. This sufficiently high rotation speed can be generated in the driving mode by intelligent shifting of the two component transmission clutches. This is assisted by appropriate coupling of the electric motor by means of a suitable shifting strategy.

According to one variant of the invention, a corresponding controller, as part of the hybrid drive transmission unit, makes provision, after starting of the internal combustion engine is requested, for the oscillating mass, as soon as it has sufficiently high kinetic energy, to be disconnected from the drive shaft, generally speaking from the output drive, by opening the component transmission clutches, so that the oscillating mass can rotate freely and the electric motor can provide all of the power for driving the vehicle. At least one of the two component transmission clutches can be shifted over to the slip mode. Owing to the slip, the output drive is not completely disconnected from the internal combustion engine.

Therefore, a pulse start without a reduction in the electromotive power available at the output shaft is subsequently possible. The hybrid drive transmission unit according to the invention is particularly suitable in order to start the internal combustion engine during start-up or in the so-called creep mode, for example up to 10 km/h, in particular up to 5 km/h. At these low speeds, there are also only very low revolution speeds in the drive system, for example only approximately 300 rpm. These are usually not sufficient in order to start the motor by means of the crankshaft which is correspondingly brought to 300 rpm. Accordingly, the rotation speed has to be higher. This increase in the rotation speed without simultaneous acceleration of the vehicle takes place by corresponding shifting strategies for the component transmission clutches, wherein the controller is preferably designed such that the output-side component transmission clutch of the two component transmission clutches is shifted over to the slip mode. The component transmission or the component transmission clutch is on the output side when it is the last component transmission or the last component transmission clutch in the force flow path to the output shaft.

After warm-up of the internal combustion engine, the slipping component transmission clutch can then be closed, and the torque of the internal combustion engine is used for driving the vehicle.

The abovementioned object is also achieved by a method for operating a vehicle with a hybrid drive and a hybrid drive transmission unit, which is connected to the internal combustion engine and its crankshaft, according to the present invention, and also with an electric motor which is coupled to a component transmission, wherein a component transmission clutch of the component transmission to which the electric motor is coupled is referred to as the "component transmission clutch which is close to the electric motor" in the text which follows. The component transmission clutch of the component transmission to which the electric motor is not coupled is referred to as the "component transmission clutch which is remote from the electric motor" in the text which follows. The method according to the invention is characterized by the following steps:

a) during the electric driving mode, the interconnected clutch is opened and the internal combustion engine is switched off, and b) starting of the internal combustion engine by closing the interconnected clutch and by transmitting the kinetic energy of the oscillating mass which is driven during the electric driving mode to the crankshaft in order to bring the internal combustion engine to a self-sustaining rotation speed.

The interconnected clutch allows only the oscillating mass to be brought to rotation speed, without the internal combustion engine having to be carried along.

Before closing of the interconnected clutch, the component transmission clutches, for starting purposes in accordance with step b) and when a prespecified minimum rotation speed of the oscillating mass is reached, are opened or held in the slip mode, in particular wherein the electric motor then furthermore drives the vehicle, on account of the permanent coupling to one of the two component transmissions, until the internal combustion engine applies a prespecified torque and takes over driving of the vehicle. In this case, the energy which in the torsion damping unit together with the oscillating mass in the moving parts which are seated between the component transmissions and the torsion damping unit has to be so high (i.e. the oscillating mass is at a prespecified minimum rotation speed) that the internal combustion engine can be brought to the self-sustaining rotation speed with the aid of said energy.

If the internal combustion engine is to be started only upon start-up or in the creep mode, that is to say before a prespecified speed (in particular approximately 10 km/h, further particularly 5 km/h) is reached when the vehicle is in the electric mode, the output-side component transmission clutch of the two component transmission clutches is shifted to the slip mode before closing of the interconnected clutch and/or after closing of the interconnected clutch. The output-side component transmission clutch is that of the two component transmission clutches which is the last of the two component transmission clutches toward the output shaft in the torque direction. This has the following advantages: the electric motor can be ramped up without the vehicle being accelerated in the process. The increased torque then drives the oscillating mass and accelerates it further than would otherwise be possible in the start-up mode or in the creep mode. When the output-side component transmission clutch is in the slip mode before closing of the interconnected clutch, the jerking which occurs during starting of the internal combustion engine can furthermore not be transmitted to the output drive. Instead, the output-side component transmission clutch correspondingly slips.

The output-side component transmission clutch, in the slip mode, is adjusted and the electric motor is brought to a rotation speed such that a required torque is applied to the output side by the electric motor and/or the oscillating mass is accelerated to the prespecified minimum rotation speed. This means that regulation takes place to the effect that neither an abrupt jump in torque upward or downward takes place at the output shaft for starting the internal combustion engine. The internal combustion engine is started in a manner which is imperceptible to the vehicle occupants.

Immediately before the beginning of the slip mode, usually as early as during the fully electric driving mode, the interconnected clutch is opened, so that the rapidly shifting clutch is indirectly decoupled from the output shaft by means of the slip mode. In addition or as an alternative, the slip mode is maintained during starting of the internal combustion engine in step b) in order to further assist starting and furthermore to conduct torque to the output drive.

For starting in accordance with step b) at a low vehicle speed until a prespecified speed (creep mode) is reached and/or during start-up of the vehicle, the component transmission clutch which is close to the electric motor is closed and the component transmission clutch which is remote from the electric motor is brought to a slip mode. This means that the total torque of the electric motor is available via the closed component transmission clutch which is close to the electric motor, which total torque is split firstly for the purpose of driving the oscillating mass and secondly for the purpose of driving the drive shaft via the component transmission clutch which is remote from the electric motor.

In particular, provision is made, after closing of the interconnected clutch, for the component transmission clutch which is close to the electric motor to still be closed and the component transmission clutch which is remote from the electric motor to be in the slip mode. This means that the electric motor assists, via the closed clutch which is close to the electric motor and via the closed intermediate clutch, the starting process of the internal combustion engine and provides, in addition to the kinetic energy of the oscillating mass, additional kinetic energy and torque.

After starting of the internal combustion engine in accordance with step b), the component transmission clutch which is remote from the motor is closed, so that the torque of the internal combustion engine can be passed to the drive train without slip. When the torque which is introduced into the power-split transmission by the internal combustion engine reaches or exceeds the torque which is introduced by the electric motor, the component transmission clutch which is close to the electric motor is opened, so that torque passes to the output shaft exclusively by means of the internal combustion engine. The electric motor is then switched off. This also ensures jerk-free transition between the electric motor driving mode and the internal combustion engine driving mode.

There are start-up situations or situations in which the vehicle is not driven in the lowest gear, for example when starting to drive downhill or when the electric motor provides an enormous amount of torque. In these cases, the vehicle can start-up, for example, in 2nd or 3rd gear. However, this would then lead to the oscillating mass being brought to an excessively low rotation speed. The invention avoids this by way of further intelligent shifting strategies. For the purpose of starting the internal combustion engine in accordance with step b), a higher gear than the lowest gear is selected above a prespecified minimum speed during the electric driving mode. In particular, this higher gear is located in the component transmission which is remote from the electric motor. The component transmission clutch which is remote from the electric motor is then shifted to the slip mode, wherein a lower gear is then engaged in the component transmission which is close to the electric motor and the component transmission clutch which is remote from the electric motor is opened and the component transmission clutch which is close to the electric motor is closed, so that there is no slip. Owing to this shifting process, the lower gear is used; it additionally accelerates the oscillating mass owing to this downshift.

In this context, provision can furthermore advantageously be made, after starting of the internal combustion engine, for the torque of said internal combustion engine to be passed to the output shaft by at least partially closing (slip mode or completely closing) the component transmission clutch which is remote from the electric motor. The component transmission clutch which is close to the electric motor is opened, in particular wherein the electric motor remains engaged until the torque of the internal combustion engine increases to the level of the torque which is applied to the output shaft by the electric motor.

In the case of electric start-up during the electric driving mode (creep mode), 3rd gear can also be initially selected and a shift can be made to 2nd gear above a prespecified speed, as a result of which the output shaft is driven by the electric motor directly by means of 2nd gear. In a subsequent step, still before closing of the interconnected clutch, the component transmission clutch which is close to the electric motor is opened and the component transmission clutch which is remote from the electric motor is closed. As a consequence of this, the torque of the electric motor is introduced into the component transmission which is remote from the electric motor on the output side and into the drive shaft by means of the component transmission which is close to the electric motor. The torque is therefore returned to a section within the dual-clutch transmission, which section is remote from the motor, in the direction of the oscillating mass and brought to higher rotation speeds owing to the use of a lower gear. The oscillating mass is accelerated by final closing of the component transmission clutch which is remote from the electric motor. These steps can also be expedient when the speed of the vehicle drops, for example when the vehicle is level or moving uphill again after a start-up process downhill. In this case, the rotation speed of the oscillating mass can be increased by means of downshifting, even selectively to 1st gear. For the purpose of starting the internal combustion engine in accordance with step b), the closed component transmission clutch is opened and the interconnected clutch is closed. It goes without saying that a shift to a higher gear can also be used for reducing the rotation speed.

In general, after starting of the internal combustion engine in accordance with step b), one of the component transmission clutches can be closed in order to couple the crankshaft to the output shaft, without slip occurring.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
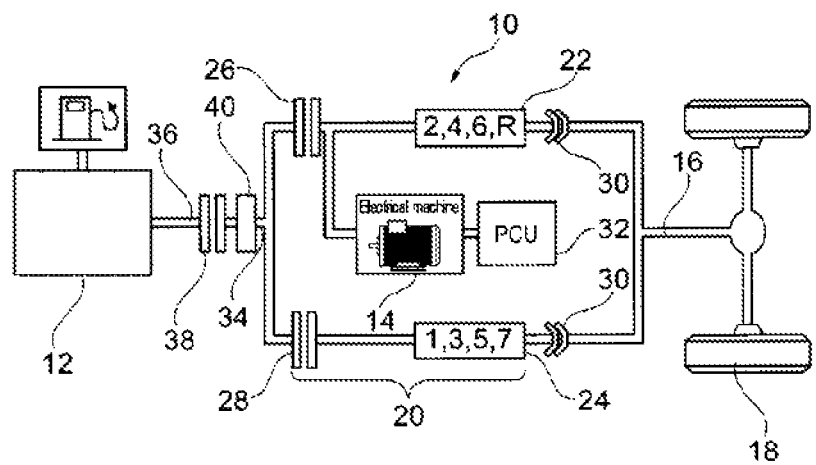
FIG. 1 shows a schematic view of a first embodiment of the hybrid drive transmission unit according to the invention, which is suitable for carrying out the method according to the invention, in the stationary mode.

FIG. 1 illustrates a drive train of a hybrid vehicle, comprising a hybrid drive transmission unit 10 which is coupled firstly to an internal combustion engine 12 and secondly to an electric motor 14.

An output shaft 16, which drives wheels 18 in the present case, can selectively be driven by means of the electric motor 14 and/or the internal combustion engine 12.

The electric motor 14 is permanently coupled into a power-split transmission 20 (a dual-clutch transmission here). The power-split transmission 20 has two component transmissions 22, 24, and also associated component transmission clutches 26 and, respectively, 28 connected upstream. Torque can be passed to the output shaft 16 by means of the component transmission 22 or the component transmission 24 or possibly by means of both component transmissions via the component transmission clutches 26, 28.

The component transmission 22 comprises, for example, the even gears 2, 4, 6 etc. and also the reverse gear, while the component transmission 24 has the odd gears 1, 3, 5 etc. Reference symbol 30 relates to the coupling tooth systems of the gear stages in the component transmissions 22, 24 but also part of the component transmission. Reference symbol 32 denotes a controller for the electric motor 14.

The crankshaft 36, which is connected to an interconnected, rapidly shifting clutch 38 on the output side is first seated on the output side of the internal combustion engine 12 between the input 34 of the dual-clutch transmission 20 and the internal combustion engine 12. A torsion damping unit 40, which can be a dual-mass flywheel, a torsion damper or a rotation speed-adaptive absorber and is provided with one or more oscillating masses or has coupled thereto, is connected between the clutch 38 and the input 34 of the dual-clutch transmission 20.

The oscillating mass is not illustrated separately; in the illustrated exemplary embodiment, it is integrated in the torsion damping unit 40 in a known manner.

All of the clutches 26, 28, 38 can be electrically switched by means of a controller which can also be the controller 32.

In the embodiment illustrated in FIG. 1, the electric motor 14 is coupled into the component transmission 22 in a manner fixed in terms of torque, specifically downstream of the component transmission clutch 26. For this reason, the component transmission 22 and the component transmission clutch 26 are referred to as the component transmission which is close to the electric motor and, respectively, as the component transmission clutch which is close to the electric motor, and the component transmission 24 is referred to as the component transmission which is remote from the electric motor and the component transmission clutch 28 is referred to as the component transmission clutch which is remote from the electric motor.

The interconnected clutch 38 is a rapidly shifting clutch which can be closed in less than 150 msec, in particular 50 msec.

In the state illustrated in FIG. 1, all of the clutches 26, 28, 38 are open; the vehicle is stationary.

The vehicle preferably does not have a separate starter for the internal combustion engine 12, which engine can be started exclusively by means of the electric motor 14. However, this is not intended to be understood as restrictive, rather it is also possible for the vehicle to have a starter for the internal combustion engine 12 but to use said starter only when the vehicle is not in the electric operating mode, but rather is immediately switched to the combustion mode during starting.

The text which follows will explain, for both of these options, how the internal combustion engine 12 is driven and started in an abrupt and pulsed manner exclusively by means of the electric motor 14 from the purely electric driving mode by skilled shifting strategies by way of the internal combustion engine being brought to a so-called self-sustaining rotation speed, even during start-up of the vehicle or in the creep driving mode.

The torque sections identified by arrows specify those torque paths within the vehicle and its hybrid drive transmission unit in which a torque is transmitted.

Figure 2:
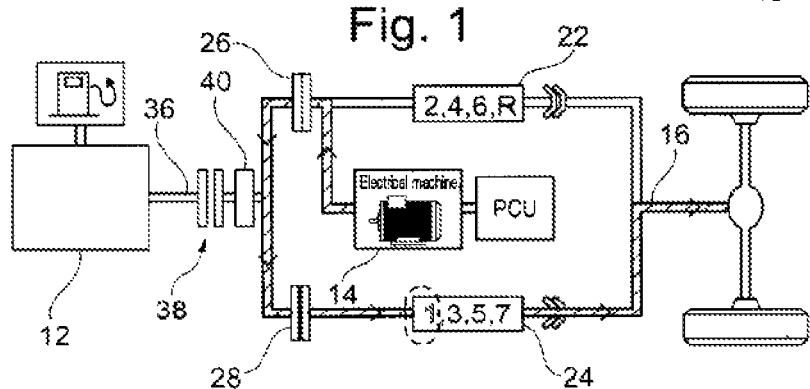
FIG. 2 shows the hybrid drive transmission unit according to FIG. 1 during start-up by the electric motor in a first step of the method according to the invention.

FIG. 2 shows a start-up mode in which the internal combustion engine 12 is switched off and the vehicle is operated exclusively by means of the electric motor 14. Here, the torque runs from the electric motor 14 in the direction of the component transmission 22 which is close to the electric motor, via the closed, component transmission clutch 26 which is close to the electric motor, to the component transmission clutch 28 which is remote from the electric motor. The component transmission clutch 28 is not completely closed here, but rather is in a slip mode, that is to say it continues to transmit a portion of the torque in the direction of the component transmission 24 which is remote from the electric motor, from where the output shaft 16 is then finally driven.

Output driving via the component transmission clutch 28 does not take place in the component transmission 22 on account of a rotation speed equalization in the synchronization unit.

Since the clutch 38 is open, the crankshaft 36 is not driven. However, the torsion damping unit 40 and its oscillating mass are driven.

Moreover, with respect to the currently selected gear, the corresponding gear is indicated by a circle formed by an interrupted line. In FIG. 2, 1st gear is selected.

Owing to the slip in the component transmission clutch 28, it is possible to speed up the torsion damping unit 40 to a rotation speed which is higher than that rotation speed which is passed to the component transmission 24 downstream of the component transmission clutch 28. Therefore, the oscillating mass is brought to a higher rotation speed, without the output shaft 16 being accelerated at the same time.

As soon as a start request is made and a sufficient amount of kinetic energy is available by means of the rapidly rotating oscillating mass in order to therefore accelerate the internal combustion engine 12 to a self-sustaining rotation speed, the clutch 38 is closed (FIG. 3) and the internal combustion engine 12 is abruptly carried along and is therefore started externally. The clutches 26, 28 can remain in the state in which they were in FIG. 2. If jerking is introduced into the power-split transmission 20 by the abrupt connection, the clutch 28 which is in the slip mode does not transmit this jerking to the output shaft 16. Therefore, the output drive is decoupled from the internal combustion engine via the component transmission clutch 28 in a certain way.

Figure 4:
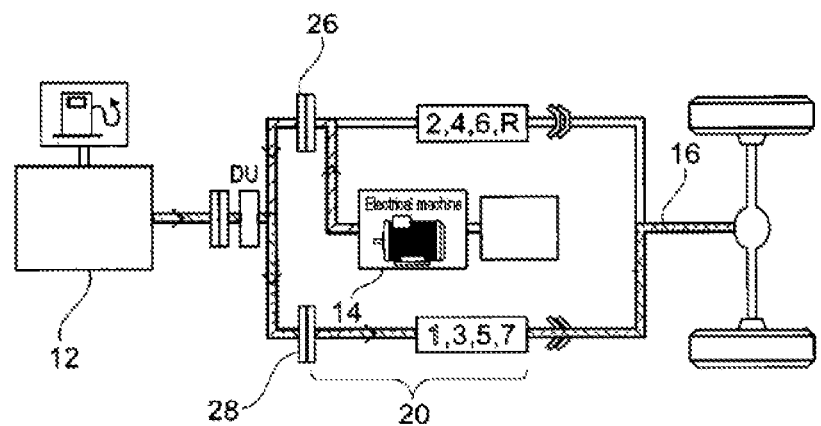
FIG. 4 shows the hybrid drive transmission unit in a subsequent step after starting of the internal combustion engine.

In the next method step (FIG. 4), the internal combustion engine 12 is started and itself introduces a torque into the power-split transmission 20, as illustrated by arrows. The component transmission clutch 28 is closed further or completely closed, so that the slip is removed.

The electric motor 14 also introduces a torque into the power-split transmission 20, so that briefly both the internal combustion engine 12 and also the electric motor 14 provide a torque for the output shaft 16.

Figure 5:
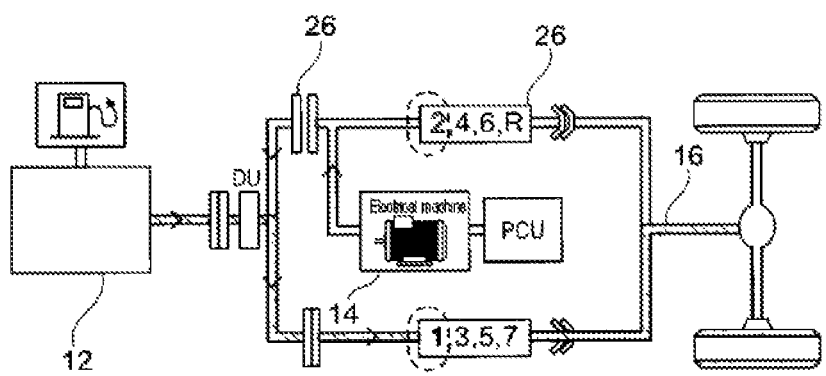
FIG. 5 shows the hybrid drive transmission unit after switch-off of the electric motor and driving only by means of the internal combustion engine.

Then, according to FIG. 5, the component transmission clutch 26 is opened, the electric motor 14 is switched off and driving takes place only by means of the internal combustion engine 12. In this case, 2nd gear was already preselected in the component transmission 26, this again being symbolized by a circle formed from an interrupted line. However, 2nd gear does not yet transmit torque.

The same hybrid drive transmission unit which is illustrated in FIG. 1 and for which the method has already been explained above with FIGS. 2 to 5 can also be operated in another situation or generally in a different way when, for example, the vehicle starts to drive slightly downhill or when an electric motor 14 with an extremely high torque is available. In this case, the vehicle is not started up in 1st gear but rather in 3rd gear in the component transmission 24.

Figure 6:
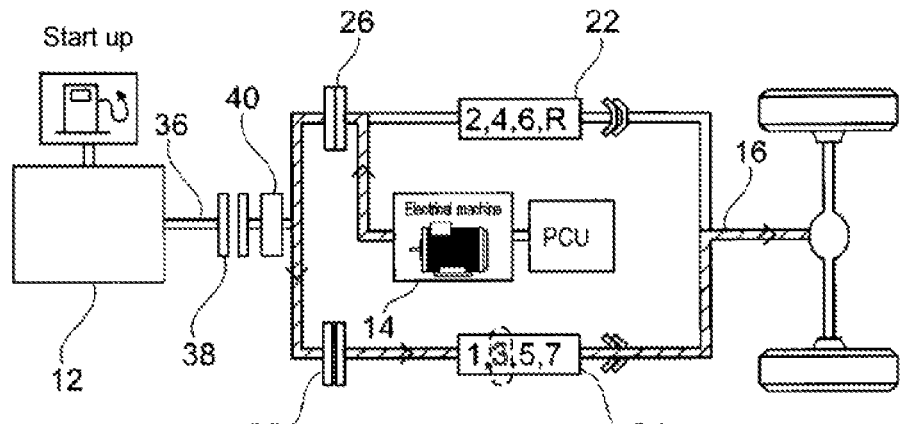
FIGS. 6 to 9 show successive steps of the method according to the invention with the hybrid drive transmission unit according to FIG. 1, wherein the internal combustion engine is engaged in 3rd gear during start-up.

According to FIG. 6, torque transmission to the output shaft 16 takes place via the closed component transmission clutch 26 and the component transmission clutch 28 which is in the slip mode, and finally by means of 3rd gear in the component transmission 24. At this time, the crankshaft 36 is not driven on account of the open clutch 38. However, according to FIG. 2, the oscillating mass of the or in the torque damping unit 40 is brought to an increased rotation speed.

Figure 3:
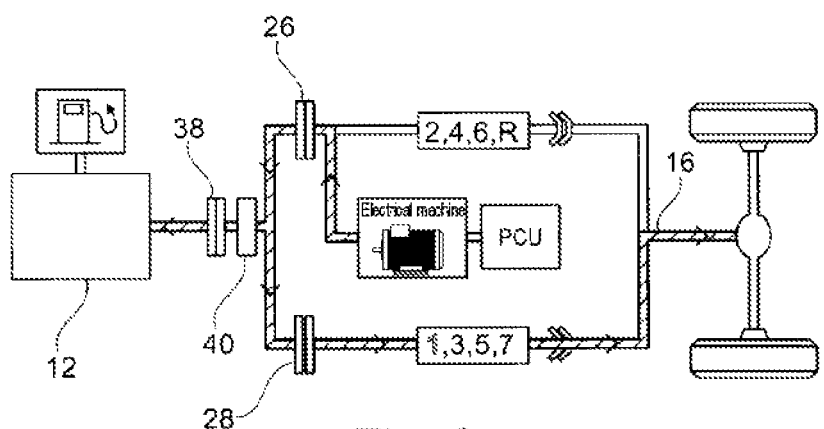
FIG. 3 shows the hybrid drive transmission unit according to FIG. 1 in a following step during initial starting of the internal combustion engine.
Figure 7:
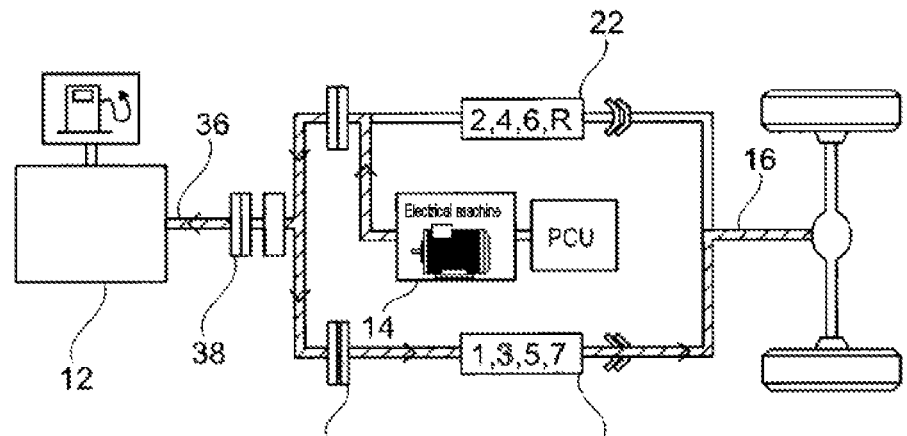
Figure 8:
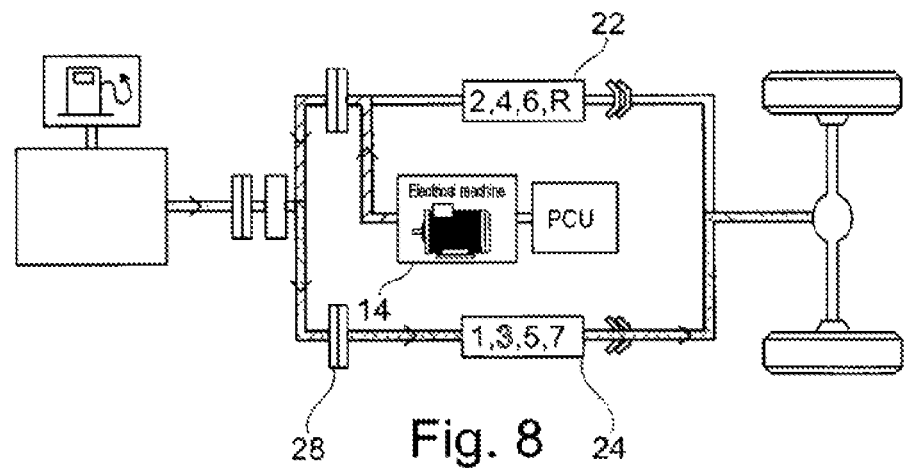

For the purpose of starting the internal combustion engine, the clutch 38 is then suddenly closed according to FIG. 7, in a manner corresponding to FIG. 3. The output shaft 16 is partially decoupled from the internal combustion engine 12 and the crankshaft 36 on account of the component transmission clutch 28 which is in the slip mode, so that no jerking is produced in the output train. The internal combustion engine 12 is abruptly speeded up until it has reached its self-sustaining rotation speed and started, this being illustrated in FIG. 8 and, apart from the fact that 3rd gear and not 1st gear is selected, corresponding to the state according to FIG. 4.

Figure 9:
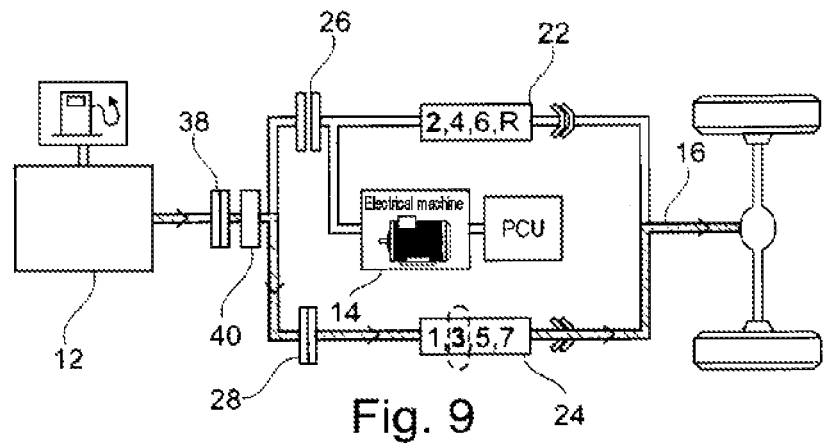
Figure 10:
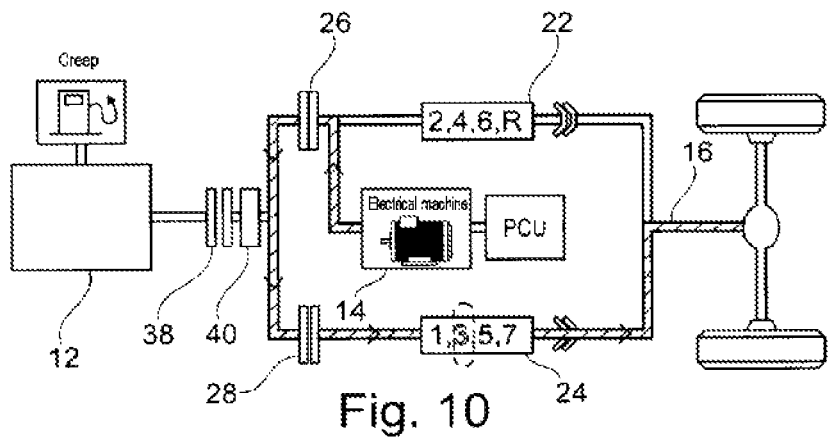
FIGS. 10 to 15 show successive steps of the method according to the invention in accordance with a further embodiment during switch-on of the internal combustion engine from creeping driving in 3rd gear.

Then (FIG. 9), as in FIG. 5, the component transmission clutch 26 is opened, the electric motor 14 is switched off and the component transmission clutch 28 is closed, so that torque transfer from the electric motor 14 to the internal combustion engine 12 takes place and only said internal combustion engine drives the output shaft 16.

This start-up in accordance with the abovementioned method according to FIGS. 2 to 8 takes place only up to a certain prespecified speed.

If the vehicle is above a prespecified minimum speed which can correspond to the limit speed just mentioned, the method described below using FIGS. 10 to 15 is applied in a creep mode (the vehicle moves very slowly as before) in order to start the internal combustion engine from the electric motor mode. Here, for example according to FIG. 10, 3rd gear is furthermore selected so that, in the creep mode, only the electric motor 14 drives the output shaft 16 via the closed component transmission clutch 26 and the component transmission clutch 28 which is in the slip mode and the component transmission 24.

It should be stressed in general that, if the vehicle is intended to be driven only in the electric motor mode and the internal combustion engine 12 is not intended to be switched on, the component transmission clutch 28 can of course also be completely closed in order to not waste any energy in the component transmission clutch 28. The component transmission clutch 28 is shifted over to the slip mode, this being explained above and also being illustrated in FIG. 10 amongst others, only when a corresponding signal for initially starting the internal combustion engine 12 is output by the controller.

In the creep mode, it may optionally be advantageous to bring the oscillating mass to a higher rotation speed by shifting over the drive path to the component transmission 22 and using 2nd gear, which is synchronized by slip build up in the component transmission clutch 28, and then to maintain said higher rotation speed, without slip in the component transmission clutches. To this end, according to FIG. 11, the component transmission clutch 28 is opened, so that the torque which is introduced by the electric motor 14 is firstly supplied by means of the component transmission 22 to the output drive 16 and secondly used via the closed component transmission clutch 26 to accelerate the torsion mass with clutch 38 open. The clutch 38 according to FIG. 13 may then be abruptly closed when starting of the internal combustion engine is required. In this case, a step, explained below, according to FIG. 12 is skipped.

However, in order to be able to shift from 3rd gear to 2nd gear (from FIG. 10 to FIG. 11), the speed of the vehicle has to have reached at least a limit speed which allows shifting to 2nd gear. Limit speeds of this kind are stored by a controller.

Figure 11:
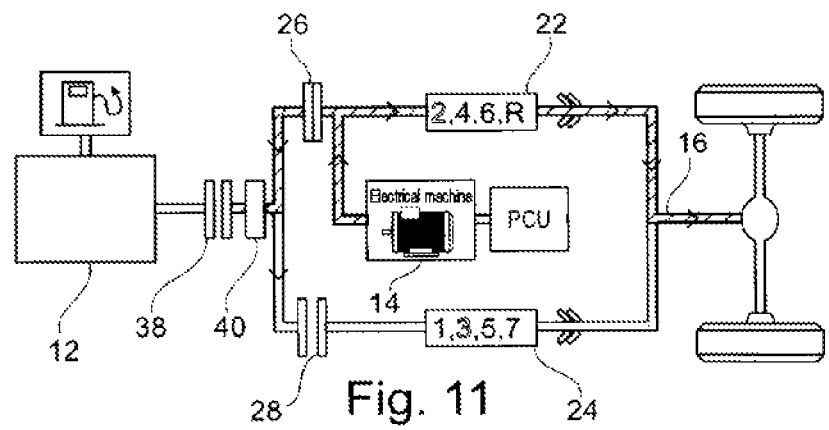
Figure 12:
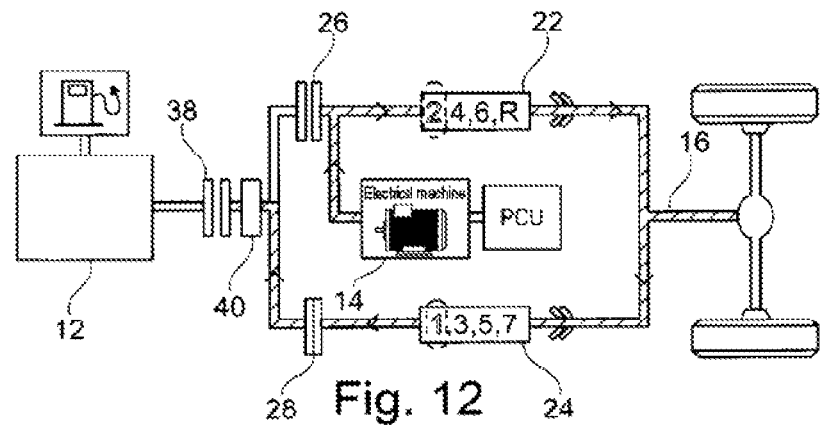

In accordance with the step according to FIG. 11, further speeding up of the oscillating mass of the torsion damping unit 40 can optionally be achieved by downshifting to 1st gear. In this case, the component transmission clutch 26 is opened, so that no torque can reach the torsion damping unit 40 via said component transmission clutch. Instead, the torque runs to the output shaft 16 by means of the component transmission 22. However, the component transmission clutch 28 is either in the slip mode or completely engaged, so that torque is introduced into the component transmission 24 via the output drive of the component transmission 22, where it leads to an increase in the rotation speed of the torsion damping unit 40 and the oscillating mass in comparison to the state according to FIG. 11 on account of the low transmission ratio of 1st gear which is selected.

Figure 13:
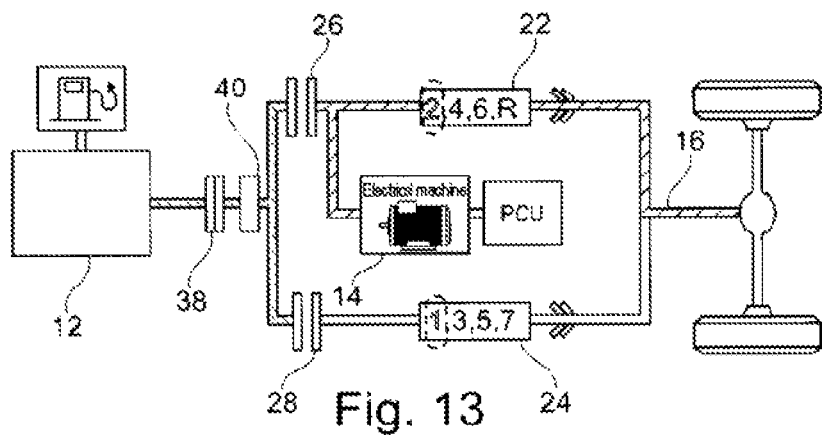

Therefore, even in the case of a reduction in speed, the kinetic energy in the oscillating mass and the parts which are directly coupled to it, apart from the component transmission clutches 26, 28 for speeding up the internal combustion engine 12, can be ensured and the component transmission clutches 26, 28 can be opened and the clutch 38 can be closed, as shown in FIG. 13, for initial starting. In this case, the electric motor 14 cannot introduce any further energy during starting of the internal combustion engine, but rather the electric motor 14 now exclusively drives the output shaft 16. In general, this shifting behavior can always be employed given a sufficient rotation speed and the coupling of the electric motor by means of a selected gear in the component transmission 22.

Figure 14:
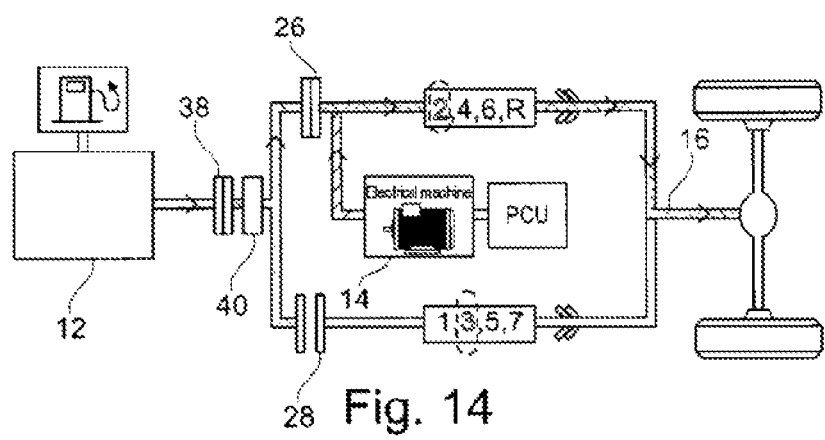
Figure 15:
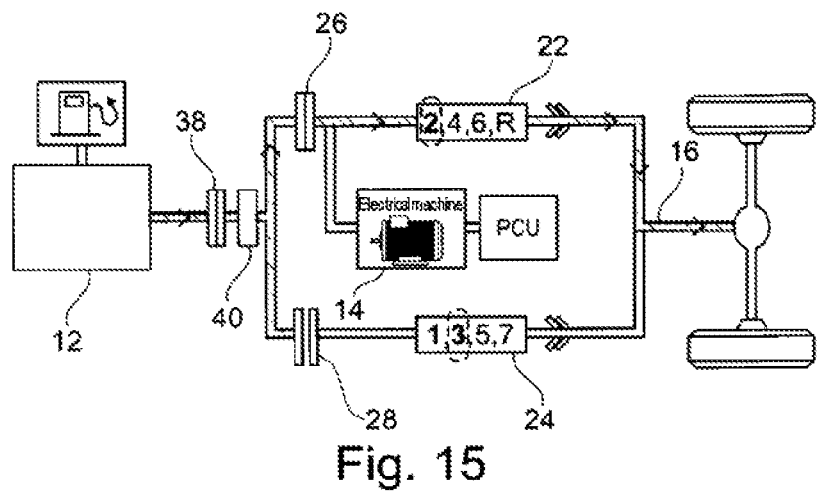

As soon as the internal combustion engine 12 is started, see FIG. 14, the component transmission clutch 26 is closed, and both the internal combustion engine 12 and also the electric motor 14 briefly drive the output shaft 16.

After the transmission of torque (see FIG. 15), the electric motor 14 is then switched off. 3rd gear is then already preselected again, while the vehicle is driven in 2nd gear. As an alternative, the component transmission clutch 28 can also be closed, the internal combustion engine then drives the output shaft 16 by means of 3rd gear of the component transmission 24; the component transmission clutch 26 is then opened.

Figure 16:
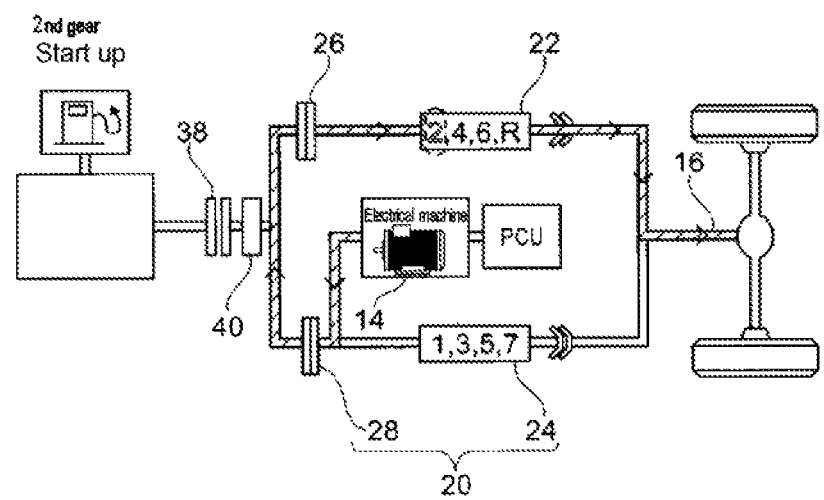
FIG. 16 shows a further embodiment of the hybrid drive transmission unit according to the invention and a first step of the method according to the invention in accordance with a further embodiment.

FIG. 16 shows a further embodiment of the hybrid drive transmission unit according to the invention which, in principle, is of very similar construction to that according to the preceding figures. The only difference is that here the electric motor 14 is incorporated fixedly in terms of torque in the train of the dual-clutch transmission 20 which is provided with the lowest gear, that is to say the train with the component transmission 24 and the component transmission clutch 28. Therefore, in this embodiment, the component transmission 24 is the component transmission 24 which is close to the electric motor and the component transmission clutch 28 is the component transmission clutch which is close to the electric motor, while the component transmission 22 is the component transmission which is remote from the electric motor and the component transmission clutch 26 is the component transmission clutch which is remote from the electric motor.

According to FIG. 16, the vehicle should start up in 2nd gear by means of the electric motor 14, so that the component transmission clutch 28 is closed and the component transmission clutch 26 is in the slip mode. The clutch 38 is open, and the oscillating mass is brought to a high rotation speed by means of the electric motor 14, without said high rotation speed being passed in the direction of the output shaft 16, this being achieved by the slip mode of the component transmission clutch 26.

In a manner corresponding to FIG. 2, no torque is passed in the direction of the output shaft 16 by means of the component transmission 24 because no torque is transmitted in the synchronization unit and no gear is engaged.

Figure 17:
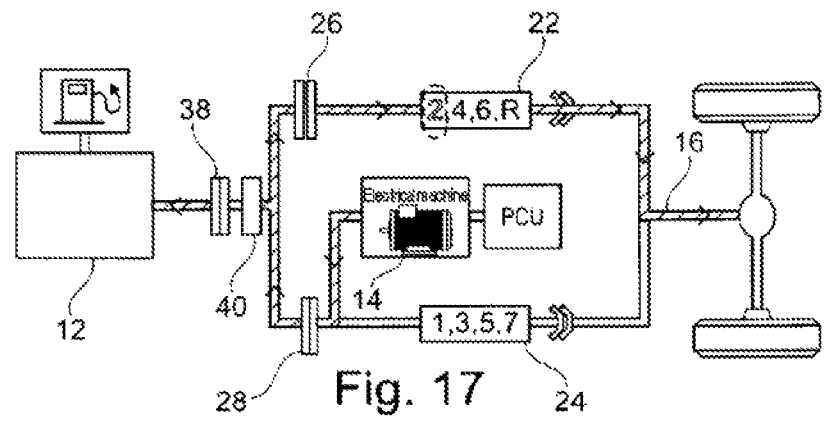
FIGS. 17 and 18 show steps of the method according to the invention, said steps following the step according to FIG. 16, in the case of initial starting of the internal combustion engine during start-up in 2nd gear.

On request, the clutch 38 is suddenly closed (FIG. 17), so that the internal combustion engine 12 is brought to the self-sustaining rotation speed for starting purposes by means of the kinetic energy primarily or exclusively with the aid of the oscillating mass 40 and the rotor inertia of the electric motor 14 here too. However, during this time, the electric motor 14 continues to drive the output shaft 16 by means of the component transmission 22. However, as in the previous embodiments, the electric motor 14 can continue to deliver energy to the oscillating mass during the starting process of the internal combustion engine 12.

Figure 18:
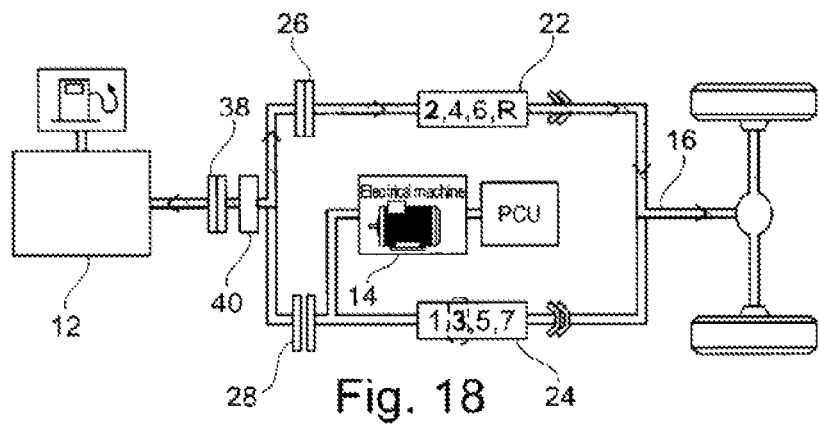

FIG. 18 then shows the operation after the transmission of torque to the internal combustion engine 12 has taken place and the component transmission clutch 28 has been opened and the component transmission clutch 26 has been completely closed. In this case, the electric motor 14 is switched off, 2nd gear is engaged and 3rd gear is preselected in order to shift to 3rd gear during subsequent acceleration.

Figure 19:
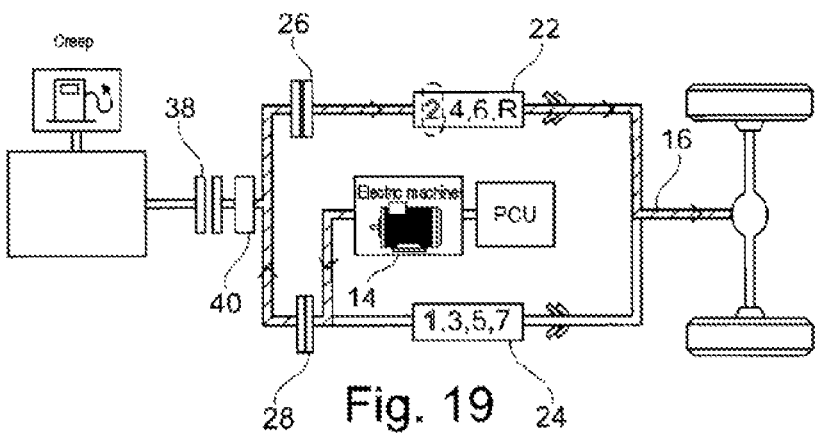
FIGS. 19 to 23 show successive steps of a further embodiment of the method according to the invention during initial starting of the internal combustion engine with creeping driving in 2nd gear.

FIG. 19 shows another driving mode, specifically when the vehicle has exceeded a prespecified speed and is in creep mode. The prespecified speed is stored here too. In this case, the speed is selected such that a shift to 1st gear can be made owing to the slip in the component transmission clutch 26. Here, the electric motor 14 still drives 2nd gear, and therefore the output shaft 16, via the closed component transmission clutch 28 and the component transmission clutch 26 which is in the slip mode. The clutch 38 is open and the oscillating mass 40 is accelerated. Output driving by means of the component transmission 24 does not yet take place on account of rotation speed equalization in the synchronization unit.

Figure 20:
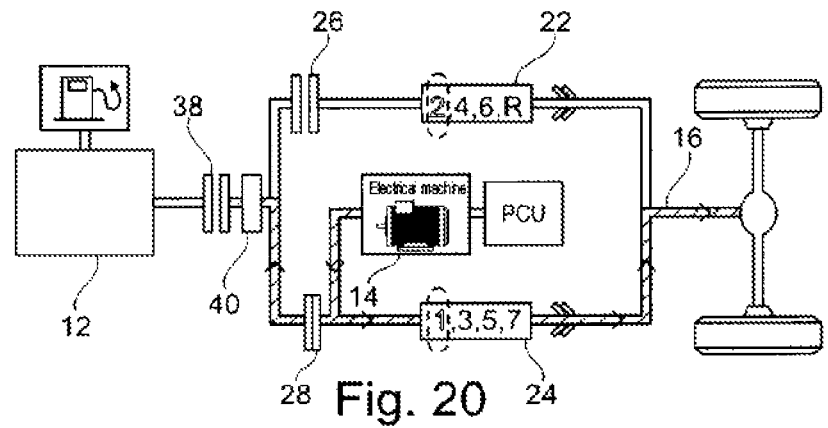

By opening the component transmission clutch 26, the torque flow is then (FIG. 20) transferred to the component transmission 24 and the electric motor 14 drives the output shaft 16 by means of 1st gear. Due to the lower transmission ratio of 1st gear, the oscillating mass 40 rotates at a sufficient rotation speed, without a component transmission clutch having to transmit torque in the slip mode.

Figure 21:
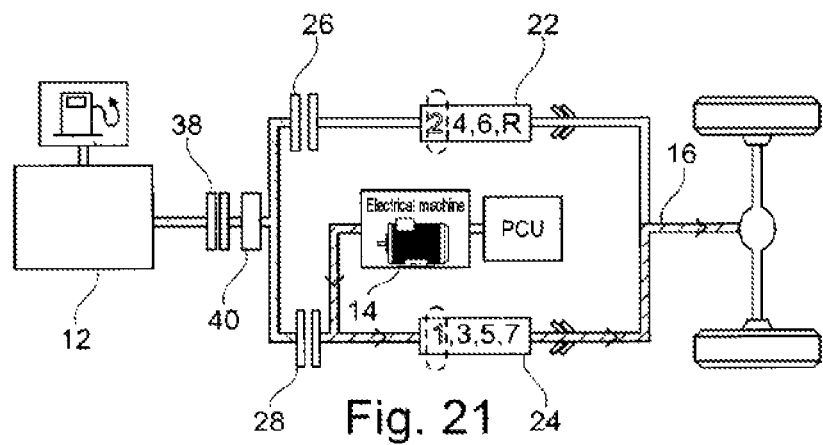

Therefore, enough kinetic energy is available in the oscillating mass 40 in order to start the internal combustion engine by opening the component transmission clutch 28 and then closing the clutch 38, see FIG. 21, so that exclusively the electric motor 14 supplies kinetic energy to the output shaft 16.

Figure 22:
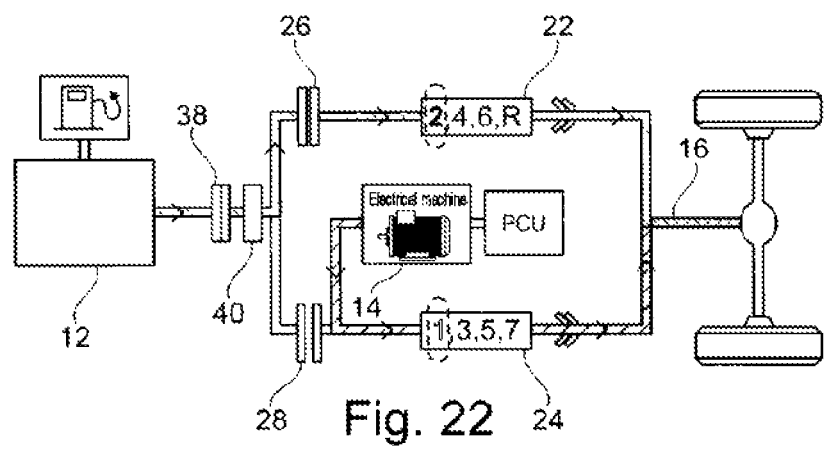

If the engine is started, according to FIG. 22 the component transmission clutch 26 is brought at least to the slip mode, so that the torque of the internal combustion engine is introduced into 2nd gear of the component transmission 22 via the component transmission clutch 26 and is passed to the output shaft 16, while at the same time the electric motor 14 also jointly drives the output shaft 16 by means of the component transmission 24.

As an alternative, the internal combustion engine 12 can also be connected to 1st gear by closing the component transmission clutch 28, in which case the component transmission clutch 26 is opened.

Figure 23:
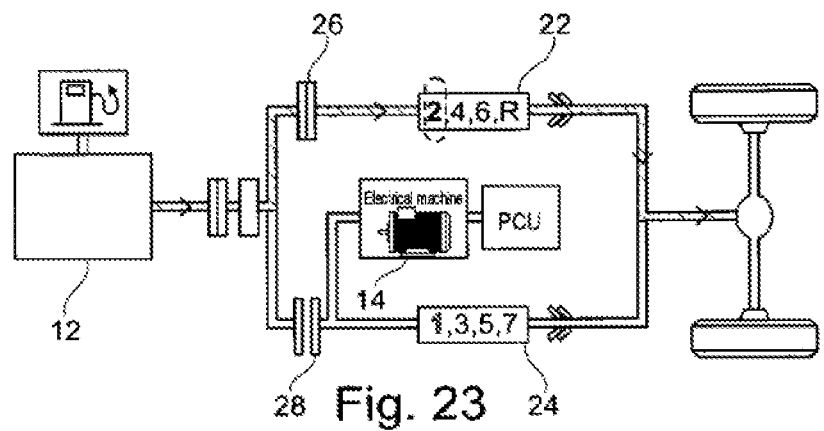

FIG. 23 then shows the state with the electric motor switched off and driving only by means of the internal combustion engine 12.

Figure 24:
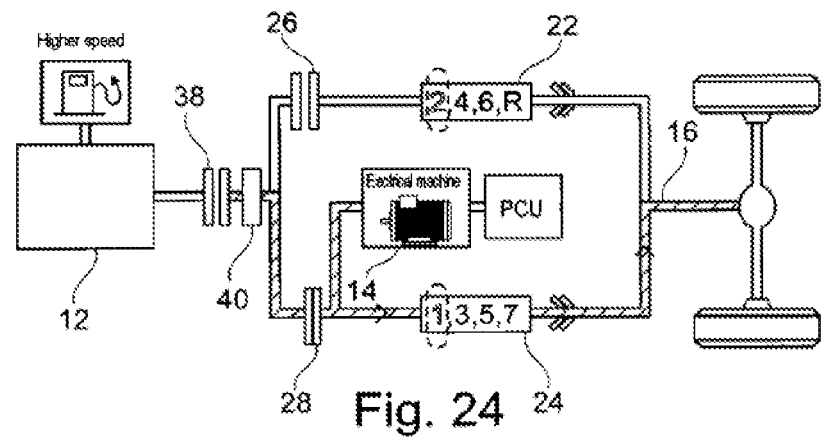
FIGS. 24 to 30 show successive steps of a further variant of the method according to the invention during initial starting of the internal combustion engine above a prespecified minimum speed.

FIG. 24 shows a starting state when the vehicle is in electric mode but is traveling above a prespecified limit speed.

This limit speed can be the limit speed starting from which the creep speed is present, or else can lie below said creep speed. However, in practice, said limit speed can also be higher than the creep speed for design reasons. In each case, said speed is selected such that driving in 1st gear is still possible.

In this situation, the electric motor 14 drives the output shaft 16 by means of 1st gear of the component transmission 24 and at the same time the oscillating mass via the closed component transmission clutch 28. The component transmission clutch 26 is open, and no torque is transmitted by means of the component transmission 22. 2nd gear is preselected.

Figure 25:
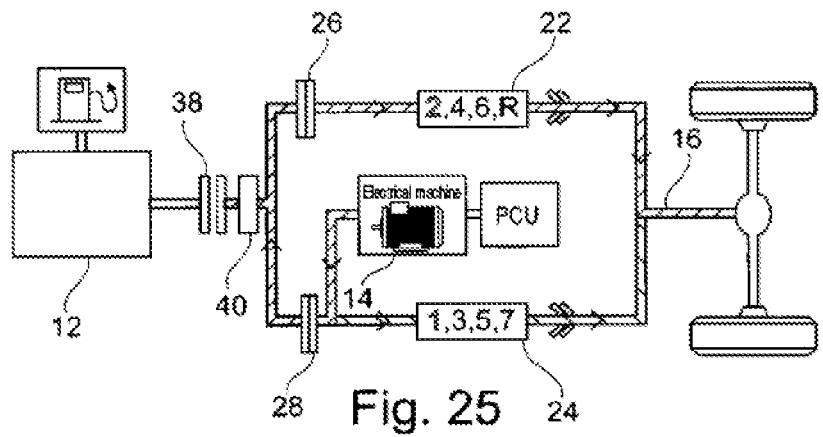

However, in this case, the speed of the vehicle is so high that shifting to 2nd gear is also possible, see FIG. 25, and in the process enough energy and rotation speed is available in order to bring the oscillating mass to the desired minimum rotation speed which is required for driving the internal combustion engine at the self-sustaining rotation speed.

In this case, the component transmission clutch 26 is in the slip mode and the component transmission clutch 28 is closed. This allows the torque flow to be redirected from the component transmission 24 to the component transmission 22 and to reach the output shaft 16 by increasing the torque in the component transmission clutch 26.

This course, illustrated with reference to FIG. 25, can of course also be employed in the hybrid drive transmission unit according to FIG. 1 with driving in a low gear and a higher gear would be enough to bring the oscillating mass to the required rotation speed.

Figure 26:
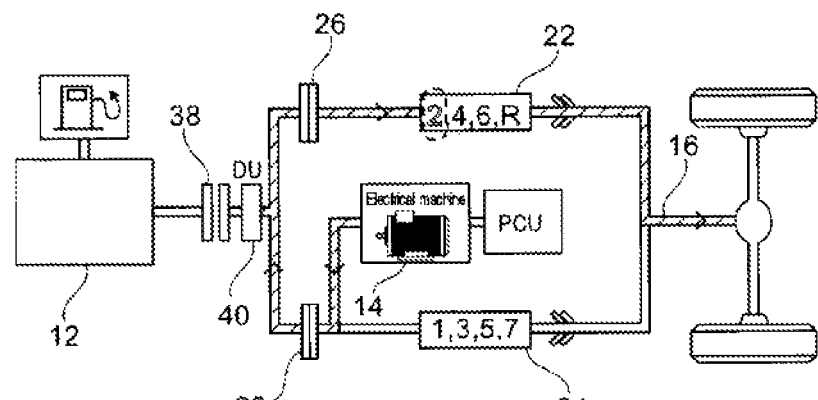

After torque transfer is complete, 1st gear is disengaged according to FIG. 26 and both component transmission clutches 26, 28 are closed. No torque transmission takes place by means of the component transmission 24. The clutch 38 is still open.

Figure 27:
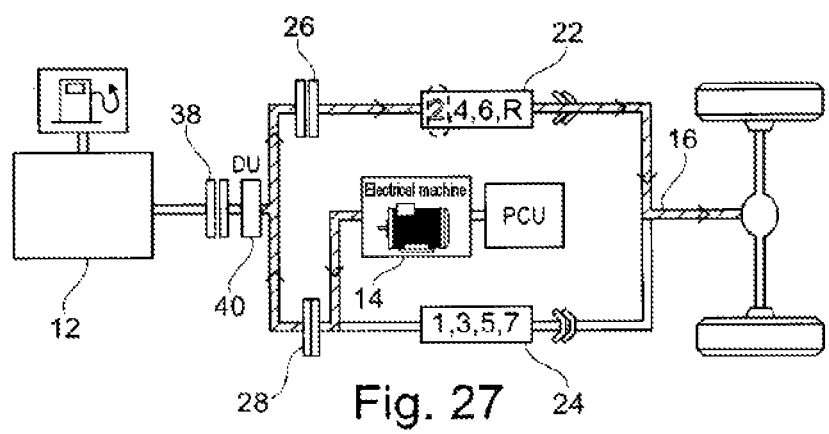

The component transmission clutch 26 then enters the slip mode (see FIG. 27), while the component transmission clutch 28 remains closed. Here, the oscillating mass can be brought to a higher rotation speed and the output shaft 16 can be driven by means of the slip mode in the component transmission clutch 26 and furthermore by means of the component transmission 22.

Figure 28:
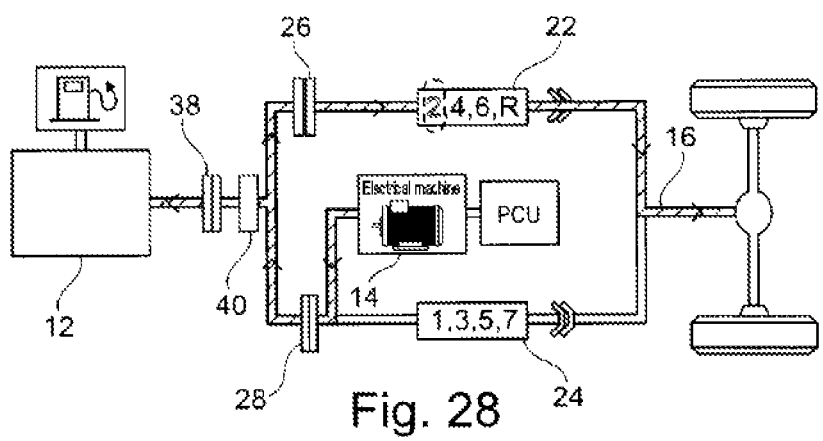

The so-called pulse start then takes place according to FIG. 28 by closing the clutch 38. The component transmission clutch 26 remains in the slip mode during this start.

Figure 29:
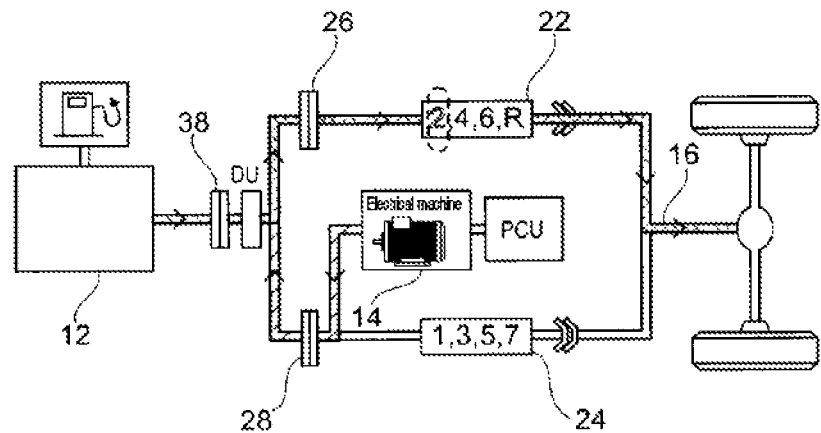

FIG. 29 shows the state when the internal combustion engine 12 is started.

The component transmission clutch 26 is closed and reduces the slip. Both the internal combustion engine and also the electric motor pass torque by means of the component transmission 22 to the output shaft 16.

Figure 30:
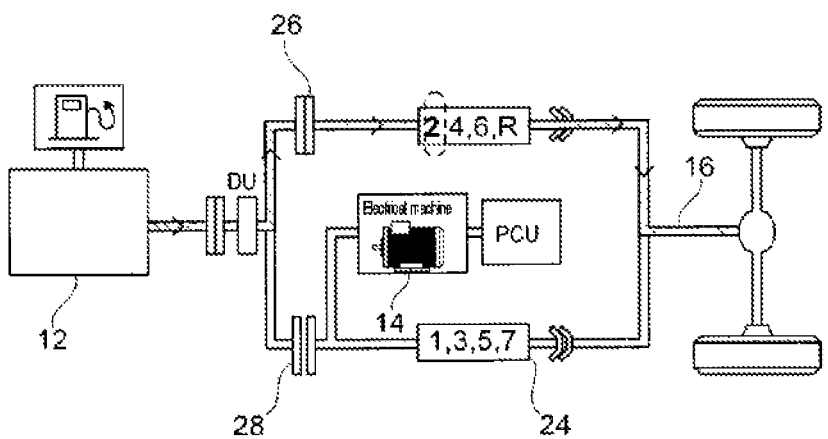

Finally, the component transmission clutch 28 can be opened and the electric motor 14 can be switched off, see FIG. 30.

The electric motor can of course also be connected as a generator for boosting purposes or for recuperation purposes during driving by the internal combustion engine 12.

In the embodiment according to FIG. 30, the electric motor can be connected by means of the 1st, 2nd, 3rd, 5th or 7th gear. Corresponding options are of course also available for the preceding embodiments. In general, it should be stressed that both component transmission clutches 26, 28 can be opened when enough kinetic energy is available in the oscillating mass, and therefore the power of the electric motor 14 is available only for the output drive and is not directed to the internal combustion engine 12 as well. In this case, the power of the electric motor 14 can be reduced. As an alternative, when initial starting of the internal combustion engine is requested, the component transmission clutch 26 or 28 can also be shifted over to the slip mode, depending on the embodiment. Therefore, a desired pulse start is likewise possible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hybrid drive transmission unit for a vehicle which, for drive purposes, has an internal combustion engine and an electric motor, comprising:
    a power-split transmission which is interconnected between the internal combustion engine and an output shaft, the power-split transmission having component transmissions and associated component transmission clutches, wherein
    the electric motor is coupled to a component transmission which is close to the electric motor in order to be able to drive the output shaft by way of said component transmission close to the electric motor;
    a torsion damping unit interconnected between the internal combustion engine and the power-split transmission, the damping unit having an oscillating mass; and
    a clutch which is interconnected between the internal combustion engine and the torsion damping unit,
    wherein the interconnected clutch is a rapidly shifting clutch which is closable in fewer than 150 msec.

2. The hybrid drive transmission unit according to claim 1, wherein
    the torsion damping unit is a dual-mass flywheel, a torsion damper or a speed-adaptive absorber.

3. The hybrid drive transmission unit according to claim 1, wherein
    the electric motor is coupled to that component transmission which contains a 2nd lowest gear.

4. The hybrid drive transmission unit according to claim 1, wherein
    the electric motor is coupled fixedly in terms of torque to a drive side of the component transmission, between a gear and an associated component transmission clutch.

5. A hybrid drive transmission unit for a vehicle which, for drive purposes, has an internal combustion engine and an electric motor, comprising:
    a power-split transmission which is interconnected between the internal combustion engine and an output shaft, the power-split transmission having component transmissions and associated component transmission clutches, wherein
    the electric motor is coupled to a component transmission which is close to the electric motor in order to be able to drive the output shaft by way of said component transmission close to the electric motor;
    a torsion damping unit interconnected between the internal combustion engine and the power-split transmission, the damping unit having an oscillating mass; and
    a clutch which is interconnected between the internal combustion engine and the torsion damping unit,
    wherein the interconnected clutch is a rapidly shifting clutch which is closable in fewer than 50 msec.

6. A method for operating a vehicle with a hybrid drive including an internal combustion engine, having a crankshaft, and an electric motor, and with a hybrid drive transmission including a power-split transmission interconnected between the internal combustion engine and an output shaft, a torsion damping unit having an oscillating mass interconnected between the internal combustion engine and the power-split transmission, and an interconnected clutch interconnected between the internal combustion engine and the torsion damping unit, wherein
    the power-split transmission has component transmissions and associated component transmission clutches,
    the electric motor is coupled to a component transmission which is close to the electric motor in order to be able to drive the output shaft,
    a component transmission clutch of the component transmission to which the electric motor is coupled forms a component transmission clutch which is close to the electric motor, and a component transmission clutch of the component transmission to which the electric motor is not coupled forms a component transmission clutch which is remote from the electric motor,
    the method comprising the steps of:
    a) during an electric driving mode, the interconnected clutch is open and the internal combustion engine is switched off; and
    b) starting the internal combustion engine by closing the interconnected clutch and by transmitting kinetic energy of the oscillating mass which is driven during the electric driving mode to the crankshaft in order to bring the internal combustion engine to a self-sustaining rotation speed.

7. The method according to claim 6, wherein
    before closing the interconnected clutch for starting purposes in accordance with step b) and when a prespecified minimum rotation speed of the oscillating mass is reached, the component transmission clutches are open or held in a slip mode, wherein the electric motor further drives the vehicle until the internal combustion engine applies a prespecified torque.

8. The method according to claim 7, wherein
for starting in accordance with step b) at a vehicle speed below a prespecified speed, before closing the interconnected clutch and/or after closing the interconnected clutch, the output-side component transmission clutch from amongst the two component transmission clutches will be or is shifted to the slip mode.

9. The method according to claim 8, wherein
the output-side component transmission clutch, in the slip mode, is adjusted and the electric motor is brought to a rotation speed such that a required torque is applied to the output shaft by the electric motor and/or the oscillating mass is accelerated to a prespecified minimum rotation speed.

10. The method according to claim 9, wherein
the interconnected clutch is opened immediately before a beginning of the slip mode and/or wherein the slip mode is maintained during starting of the internal combustion engine in step b).

11. The method according to claim 6, wherein
for starting in accordance with step b) at a vehicle speed below a prespecified speed and/or during starting in accordance with step b) during start-up of the vehicle, the component transmission clutch which is close to the electric motor is closed and the component transmission clutch which is remote from the electric motor is brought to a slip mode,
the torque of the electric motor is transmitted to the output shaft via the two component transmission clutches and by way of the component transmission which is remote from the electric motor.

12. The method according to claim 11, wherein
after closing the interconnected clutch, the component transmission clutch which is close to the electric motor remains closed and the component transmission clutch which is remote from the electric motor remains in the slip mode, until the internal combustion engine starts.

13. The method according to claim 12, wherein
after starting the internal combustion engine in accordance with step b), the component transmission clutch which is remote from the electric motor is closed, and, when the torque which is introduced into the power-split transmission by the electric motor is reached or exceeded by the torque which is introduced into the power-split transmission by the internal combustion engine, the component transmission clutch which is close to the electric motor is opened, so that torque passes to the output shaft exclusively by way of the internal combustion engine.

14. The method according to claim 6, wherein
for the purpose of starting the internal combustion engine in accordance with step b), a higher gear than the lowest gear is selected above a prespecified minimum speed during the electric driving mode, wherein said higher gear is located in the component transmission which is remote from the electric motor, and
the component transmission clutch which is remote from the electric motor is shifted to the slip mode, wherein a lower gear is then engaged in the component transmission which is close to the electric motor and the component transmission clutch which is remote from the electric motor is opened, so that the oscillating mass is accelerated on account of the lower gear.

15. The method according to claim 14, wherein
after starting the internal combustion engine, the torque of said internal combustion engine is passed to the output shaft by at least partially closing the component transmission clutch which is remote from the electric motor and the component transmission clutch which is close to the electric motor is opened, wherein the electric motor remains engaged until the torque of the internal combustion engine increases to the level of the torque of the electric motor which is applied to the output shaft.

16. The method according to claim 15, wherein
for the purpose of starting the internal combustion engine in accordance with step b), 3rd gear is initially selected above a prespecified minimum speed during the electric driving mode, then a downshift to 2nd gear occurs and the output shaft is driven by the electric motor above 2nd gear and, in a following step, still before closing the interconnected clutch, the component transmission clutch which is close to the electric motor is opened and the component transmission clutch which is remote from the electric motor is closed, so that the torque of the electric motor is introduced into the component transmission which is remote from the electric motor by way of the component transmission which is close to the electric motor and the output shaft, and the oscillating mass is accelerated by closing the component transmission clutch which is remote from the electric motor.

17. The method according to claim 6, wherein
after starting the internal combustion engine in accordance with step b), one of the component transmission clutches is closed in order to couple the crankshaft to the output shaft.

* * * * *